(12) United States Patent
Ando (10) Patent No.: US 12,118,347 B2
(45) Date of Patent: Oct. 15, 2024

(54) ELECTRICALLY POWERED VEHICLE, METHOD OF CONTROLLING ELECTRICALLY POWERED VEHICLE, AND CONTROLLER THAT CONTROLS ELECTRICALLY POWERED VEHICLE

(71) Applicant: TOYOTA JIDOSHA KABUSHIKI KAISHA, Toyota (JP)

(72) Inventor: Toru Ando, Obu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 88 days.

(21) Appl. No.: 17/870,420

(22) Filed: Jul. 21, 2022

(65) Prior Publication Data

US 2023/0034680 A1  Feb. 2, 2023

(30) Foreign Application Priority Data

Jul. 28, 2021  (JP) ................................. 2021-123230

(51) Int. Cl.
| | |
|---|---|
| G06F 8/656 | (2018.01) |
| B60L 53/62 | (2019.01) |
| B60L 58/12 | (2019.01) |
| B60L 58/13 | (2019.01) |
| G06F 8/65 | (2018.01) |

(52) U.S. Cl.
CPC .............. *G06F 8/656* (2018.02); *B60L 53/62* (2019.02); *B60L 58/12* (2019.02); *B60L 58/13* (2019.02); *G06F 8/65* (2013.01); *B60L 2270/40* (2013.01); *Y02T 10/70* (2013.01); *Y02T 10/7072* (2013.01)

(58) Field of Classification Search
CPC .. G06F 8/60–66; B60L 2270/40; B60L 53/62; B60L 58/12; B60L 58/13; Y02T 10/70; Y02T 10/7072

USPC .................................................. 717/168–178
See application file for complete search history.

(56) References Cited

U.S. PATENT DOCUMENTS

2013/0132939 A1  5/2013  Murata et al.

FOREIGN PATENT DOCUMENTS

| | | | |
|---|---|---|---|
| JP | 2011000894 A | * | 1/2011 |
| JP | 2013-91434 A | | 5/2013 |
| JP | 2013-151222 A | | 8/2013 |
| JP | 2017-097620 A | | 6/2017 |
| JP | 2018-086894 A | | 6/2018 |
| JP | 2020-013444 A | | 1/2020 |
| JP | 2020-017221 A | | 1/2020 |

(Continued)

OTHER PUBLICATIONS

Buschlinger, Lucas, et al., Plug-and-Patch: Secure Value Added Services for Electric Vehicle Charging, ARES '19: Proceedings of the 14th International Conference on Availability, Reliability and Security, Aug. 2019, 10 pages, [retrieved on May 23, 2024], Retrieved from the Internet: <URL:http://dl.acm.org/>.*

*Primary Examiner* — Geoffrey R St Leger
(74) *Attorney, Agent, or Firm* — Sughrue Mion, PLLC (57) ABSTRACT

An update ECU performs processing including obtaining an OTA-target ECU when an OTA request has been issued, requesting a target ECU to perform update processing when the target ECU falls under an ECU that operates during traveling and when an electrically powered vehicle is being externally charged, and requesting a target ECU to perform update processing when the target ECU falls under an ECU that operates during external charging and when the electrically powered vehicle is traveling.

6 Claims, 7 Drawing Sheets

(56) References Cited

FOREIGN PATENT DOCUMENTS

WO       2011/161778 A1    12/2011
WO    WO-2016147766 A1 *  9/2016   ............. B60R 16/02

* cited by examiner

ELECTRICALLY POWERED VEHICLE, METHOD OF CONTROLLING ELECTRICALLY POWERED VEHICLE, AND CONTROLLER THAT CONTROLS ELECTRICALLY POWERED VEHICLE

This nonprovisional application is based on Japanese Patent Application No. 2021-123230 filed with the Japan Patent Office on Jul. 28, 2021, the entire contents of which are hereby incorporated by reference.

BACKGROUND

Field

The present disclosure relates to update of control programs of a plurality of controllers mounted on an electrically powered vehicle.

Description of the Background Art

A plurality of controllers that control operations of various vehicle-mounted electrical devices are mounted on an electrically powered vehicle. Any one of control programs of the plurality of controllers is updated not only with data transmitted through a wire but also with the use of what is called an over-the-air (OTA) technique which is update with update information received through wireless communication from a server outside the electrically powered vehicle. During update of a control program with the use of such an OTA technique, supply of power to a controller which is a target of update should not be stopped.

For example, Japanese Patent Laying-Open No. 2013-151222 discloses a technique to prohibit supply of power to a device other than a device relating to update of a charging control program from an auxiliary battery of a vehicle when a supply voltage of the auxiliary battery is determined as being equal to or lower than a prescribed value.

SUMMARY

When update of control programs of a plurality of controllers is required, update of the control programs in parallel in the plurality of controllers may lead to increase in power consumption at the time of update. Furthermore, when a long time period is required for update of the control programs, a period for update may not be secured or lowering in amount of stored power in the auxiliary battery due to forced update may not be suppressed.

An object of the present disclosure is to provide an electrically powered vehicle, a method of controlling an electrically powered vehicle, and a controller that controls an electrically powered vehicle, with which a period for update is secured while increase in power consumption at the time of update of control programs of a plurality of controllers mounted on the electrically powered vehicle is suppressed.

An electrically powered vehicle according to one aspect of the present disclosure includes a power storage chargeable with a power supply outside the vehicle, a drive motor that drives the vehicle with electric power in the power storage, a reception apparatus that receives predetermined information from outside of the vehicle, and a control system composed of a plurality of controllers including a first controller and a second controller. The first controller controls, by using a first control program, a device to be controlled that operates during charging of the power storage with the power supply outside the vehicle. The second controller controls, by using a second control program, a device to be controlled that operates during traveling of the vehicle with the drive motor. When the control system receives update information of the first control program with the reception apparatus, the control system updates the first control program with the update information during traveling. When the control system receives update information of the second control program with the reception apparatus, the control system updates the second control program with the update information during charging.

Thus, by updating the first control program of the first controller during traveling and updating the second control program of the second controller during charging, a period for update can be secured. Furthermore, by updating the first control program and updating the second control program during different periods, increase in power consumption at the time of update can be suppressed as compared with power consumption at the time of update of the first control program and the second control program in parallel.

In one embodiment, the plurality of controllers further include a third controller that controls, by using a third control program, a device to be controlled that operates during each of charging and traveling. When the control system receives update information of the third control program with the reception apparatus, the control system updates the third control program with the update information while the vehicle is in a standstill.

Since the third control program of the third controller that operates during charging and during traveling is thus updated while the vehicle is in a standstill, the period for update can be secured. Furthermore, by updating the third control program during a period different from the periods for update of the first control program and update of the second control program, increase in power consumption at the time of update can be suppressed as compared with power consumption at the time of update of the first to third control programs in parallel.

In yet another embodiment, the electrically powered vehicle further includes an auxiliary battery that supplies electric power to the third controller. When the control system receives the update information of the third control program with the reception apparatus, the control system has the auxiliary battery charged during at least any one of charging and traveling. When an amount of stored power in the auxiliary battery is equal to or larger than a threshold value on which update of the third control program can be based while the vehicle is in a standstill, the control system updates the third control program with the update information.

Thus, the third control program can be updated without electric power in the auxiliary battery becoming insufficient while the vehicle is in a standstill.

In yet another embodiment, when the control system receives the update information of the first control program with the reception apparatus and a distance that the electrically powered vehicle can travel (distance to empty) becomes shorter than a distance to a destination of the vehicle due to increase in amount of power consumption with update of the first control program, the control system does not update the first control program during traveling.

Thus, since the first control program is not updated during traveling when the vehicle is unable to arrive at the destination if electric power is consumed by update of the first control program, the vehicle is able to arrive at the destination.

In yet another embodiment, when the control system receives the update information of the second control program with the reception apparatus and charging of the power storage cannot be completed by departure time due to increase in amount of power consumption with update of the second control program, the control system does not update the second control program during charging.

Thus, since the second control program is not updated during charging when charging of the power storage cannot be completed by the departure time if electric power is consumed by update of the second control program, charging of the power storage can be completed by the departure time.

A method of controlling an electrically powered vehicle according to another aspect of the present disclosure is a method of controlling an electrically powered vehicle including a power storage chargeable with a power supply outside the vehicle, a drive motor that drives the vehicle with electric power in the power storage, a reception apparatus that receives predetermined information from outside of the vehicle, and a control system composed of a plurality of controllers including a first controller and a second controller. The first controller controls, by using a first control program, a device to be controlled that operates during charging of the power storage with the power supply outside the vehicle. The second controller controls, by using a second control program, a device to be controlled that operates during traveling of the vehicle with the drive motor. The method includes updating, when update information of the first control program is received with the reception apparatus, the first control program with the update information during traveling and updating, when update information of the second control program is received with the reception apparatus, the second control program with the update information during charging.

A controller that controls an electrically powered vehicle according to yet another aspect of the present disclosure is a controller that controls an electrically powered vehicle including a power storage chargeable with a power supply outside the vehicle, a drive motor that drives the vehicle with electric power in the power storage, and a reception apparatus that receives predetermined information from outside of the vehicle. The controller is configured to communicate with a first controller that controls, by using a first control program, a device to be controlled that operates during charging of the power storage with the power supply outside the vehicle and a second controller that controls, by using a second control program, a device to be controlled that operates during traveling of the vehicle with the drive motor. When the controller receives update information of the first control program with the reception apparatus, the controller requests the first controller to update the first control program with the update information during traveling. When the controller receives update information of the second control program with the reception apparatus, the controller requests the second controller to update the second control program with the update information during charging.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present disclosure will be described below in detail with reference to the drawings. The same or corresponding elements in the drawings have the same reference characters allotted and description thereof will not be repeated.

Figure 1:
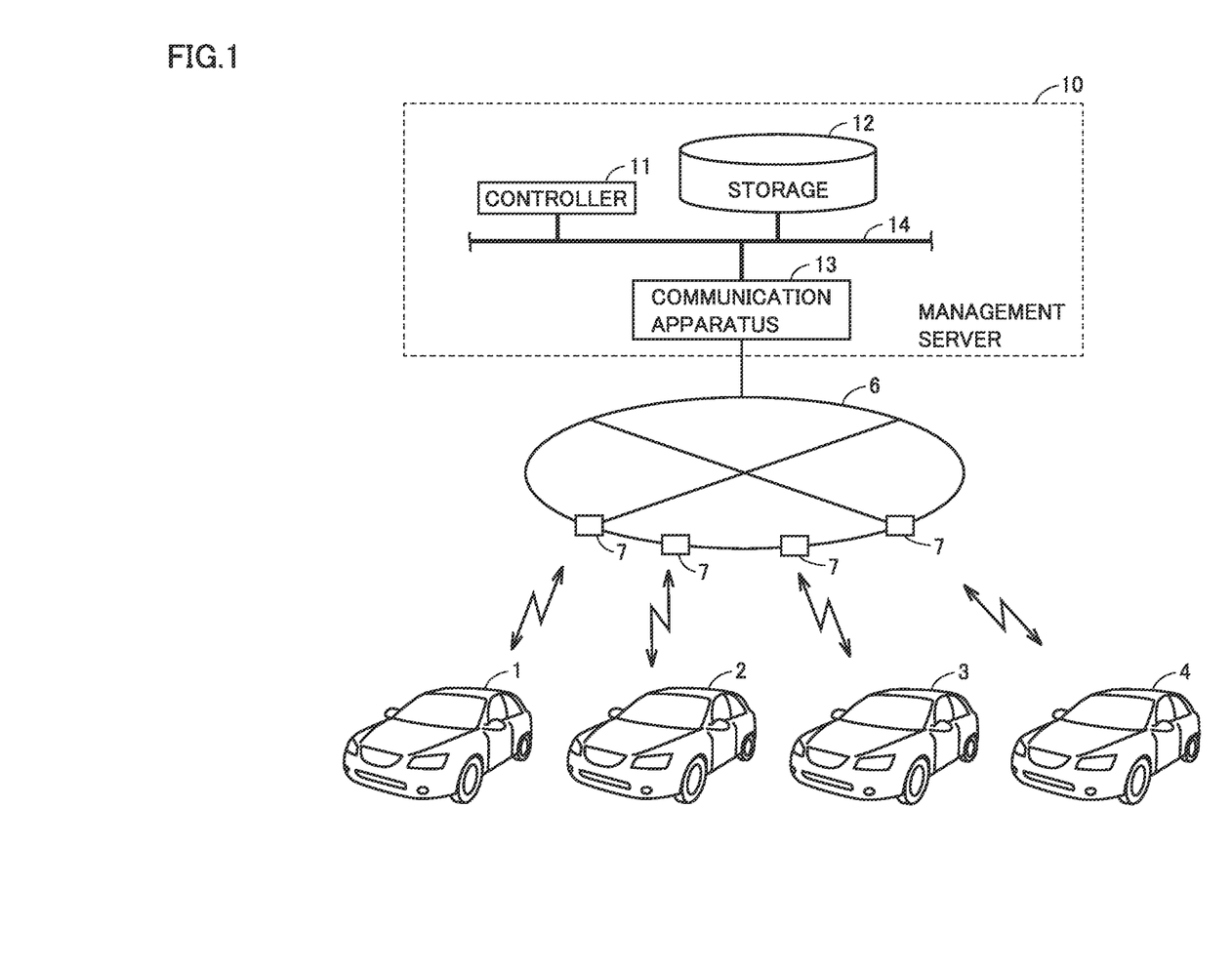
FIG. 1 is a diagram for illustrating an exemplary configuration of a management server and a plurality of electrically powered vehicles that can communicate with the management server.

FIG. 1 is a diagram for illustrating an exemplary configuration of a management server 10 and a plurality of electrically powered vehicles 1, 2, 3, and 4 (which will be denoted as "1 to 4" below) that can communicate with management server 10.

As shown in FIG. 1, management server 10 is configured to communicate with each of a plurality of electrically powered vehicles including electrically powered vehicles 1 to 4 through base stations 7 provided on a communication network 6. Identification information for identifying electrically powered vehicles 1 to 4 is stored in advance in management server 10. The identification information is specific information set for each vehicle. Version information, revision information, and records of update of various control programs of each of electrically powered vehicles 1 to 4 are further stored in management server 10 in association with the identification information described above. Management server 10 manages a status of update of various control programs used for operations of electrically powered vehicles 1 to 4. When a new version of at least any one of the plurality of control programs is ready, management server 10 requests a target vehicle among electrically powered vehicles 1 to 4 to update the control program.

Management server 10 is a computer including a controller 11, a storage 12, and a communication apparatus 13. Controller 11, storage 12, and communication apparatus 13 are communicatively connected to one another through a communication bus 14.

A management list including the identification information of electrically powered vehicles 1 to 4 and the above-described status of update associated with the identification information is stored in storage 12. The management list may further include other information (time and day of update and a status of update for each control program) associated with the identification information. Communication apparatus 13 allows bidirectional communication between controller 11 and communication network 6.

Controller 11 includes a central processing unit (CPU), a memory (a read only memory (ROM) and a random access memory (RAM)), and an input and output port for input and output of various signals, none of which is shown. Various types of control by controller 11 are carried out by software processing, that is, reading by the CPU of a program stored in the memory. Various types of control by controller 11 can also be carried out by execution of a program stored in a storage medium by a general-purpose server (not shown). Various types of control by controller 11 are not limited to software processing, but may also be carried out by processing by dedicated hardware (electronic circuitry).

Though description is given with reference to an example in which management server 10 described above manages four electrically powered vehicles 1 to 4, the number of managed electrically powered vehicles is not particularly limited to four, and management server 10 may manage three or less or five or more electrically powered vehicles.

A specific configuration of electrically powered vehicle 1 according to the present embodiment will now be described. Since electrically powered vehicles 2 to 4 are basically common in configuration to electrically powered vehicle 1, detailed description of the configuration thereof will not be repeated.

Figure 2:
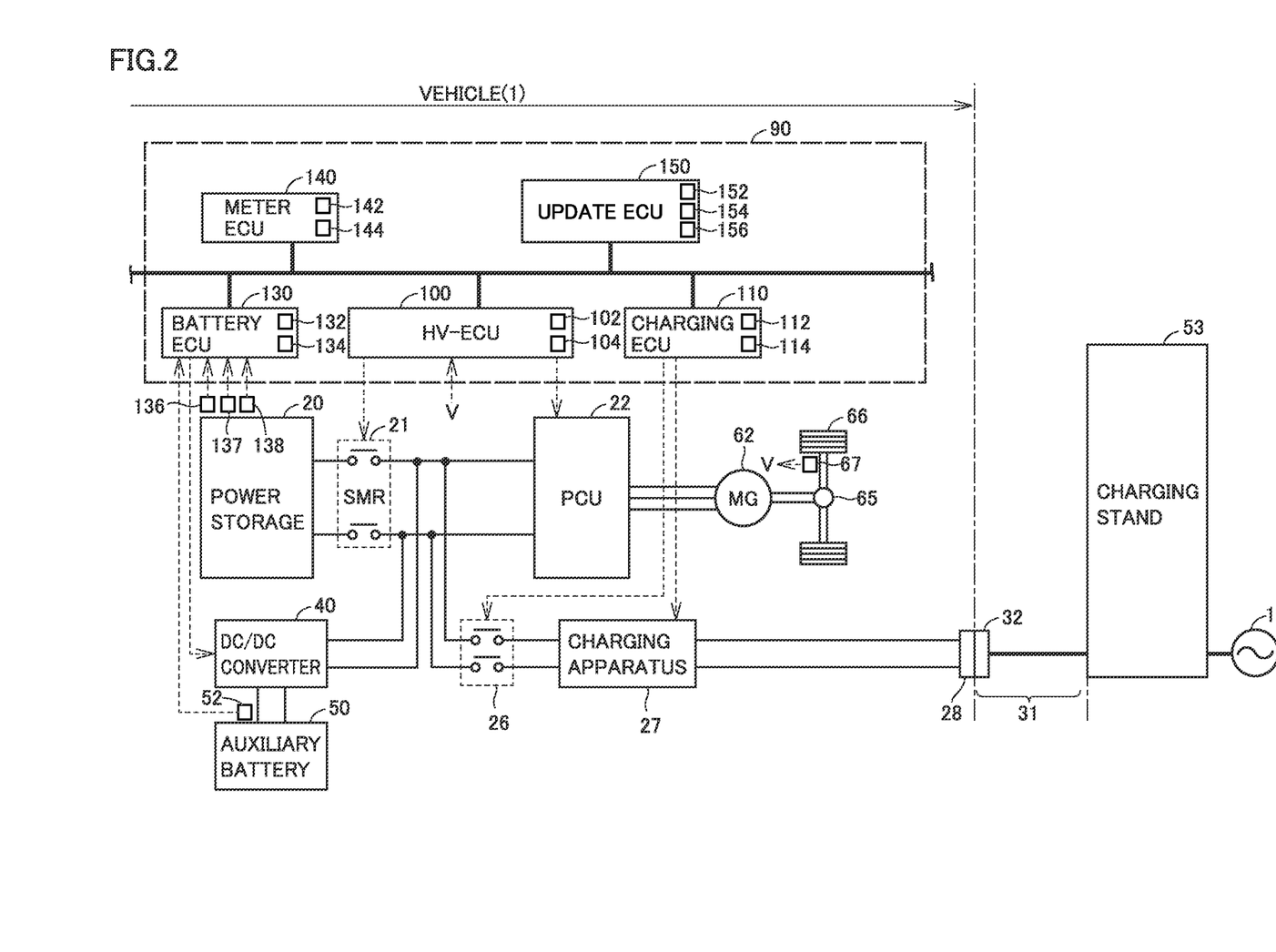
FIG. 2 is a diagram schematically showing an exemplary configuration of the electrically powered vehicle according to the present embodiment.

FIG. 2 is a diagram schematically showing an exemplary configuration of electrically powered vehicle 1 according to the present embodiment. Referring to FIG. 2, electrically powered vehicle 1 includes a power storage 20, a system main relay (SMR) 21, a power control unit (PCU) 22, a direct-current (DC)/DC converter 40, an auxiliary battery 50, a motor generator (which is denoted as MG below) 62, a power transmission gear 65, a drive wheel 66, and a control system 90.

Power storage 20 is a rechargeable DC power supply and includes, for example, a secondary battery such as a nickel metal hydride battery or a lithium ion battery containing a liquid or solid electrolyte. A capacitor such as an electric double layer capacitor can also be adopted as power storage 20. Power storage 20 supplies electric power for generating traveling driving force of electrically powered vehicle 1 to PCU 22. Power storage 20 is charged with electric power generated by a regenerative operation by MG 62 or discharged by an operation to drive MG 62, or is charged with electric power supplied from the outside of the vehicle or discharged by supply of electric power to the outside of the vehicle.

SMR 21 is electrically connected between power storage 20 and PCU 22. Closing/opening of SMR 21 is controlled in accordance with a command from an HV-electronic control unit (ECU) 100 of control system 90.

PCU 22 converts electric power between power storage 20 and MG 62 in accordance with a command from HV-ECU 100 of control system 90. PCU 22 includes an inverter that drives MG 62 by receiving electric power from power storage 20 and a converter that adjusts a level of a DC voltage supplied to the inverter (neither of which is shown).

MG 62 is a three-phase alternating-current (AC) rotating electric machine, and it is, for example, a permanent magnet synchronous motor including a rotor having a permanent magnet embedded therein. MG 62 performs a function as a motor and a generator. MG 62 is connected to power storage 20 with PCU 22 being interposed.

MG 62 is driven, for example, by the inverter included in PCU 22 while electrically powered vehicle 1 travels. Motive power of MG 62 is transmitted to drive wheel 66 through power transmission gear 65. For example, during braking of electrically powered vehicle 1, MG 62 is driven by drive wheel 66 to operate as the generator so that MG 62 applies regenerative braking. Electric power generated by MG 62 is stored in power storage 20 through PCU 22.

Electrically powered vehicle 1 further includes a charging relay 26, a charging apparatus 27, and an inlet 28 as features for charging with the use of an AC power supply 15 outside electrically powered vehicle 1 (which may be denoted as external charging below). A connector 32 is coupled to inlet 28. Connector 32 is coupled to a charging stand 53 through a cable 31. FIG. 2 shows a state that connector 32 has been attached to inlet 28. Connector 32 is constructed as being attachable to and removable from inlet 28. When external charging is carried out, connector 32 is attached to inlet 28, and when electrically powered vehicle 1 operates, connector 32 is removed from inlet 28. Charging stand 53 is supplied with AC power from AC power supply 15. As connector 32 is attached to inlet 28, AC power can be supplied from charging stand 53 to electrically powered vehicle 1.

During external charging of power storage 20, electric power is supplied from a side of charging stand 53 through cable 31, connector 32, and inlet 28. Charging apparatus 27 converts electric power supplied from the side of charging stand 53 to electric power with which power storage 20 can be charged (which is denoted as charging power below), and resultant charging power is supplied to power storage 20.

Charging relay 26 is electrically connected between power storage 20 and charging apparatus 27. When charging relay 26 is closed and SMR 21 is closed, electric power can be transmitted between inlet 28 and power storage 20.

Charging apparatus 27 is electrically connected between charging relay 26 and inlet 28. Charging apparatus 27 converts electric power (for example, AC power of AC 100 V) supplied from charging stand 53 into charging power (DC power) in accordance with a command from HV-ECU 100 of control system 90.

DC/DC converter 40 is electrically connected between SMR 21 and charging apparatus 27. Therefore, when SMR 21 is closed, electric power can be supplied from power storage 20 to DC/DC converter 40. DC/DC converter 40 lowers a high DC voltage of power storage 20 to a low DC voltage in accordance with a command from a battery ECU 130 of control system 90. The resultant low DC voltage is supplied to an auxiliary load (not shown) and to auxiliary battery 50. Auxiliary battery 50 is thus charged.

Auxiliary battery 50 is a secondary battery such as a lead acid battery, and can be charged with and discharge a low DC voltage (for example, electric power around 12 V) at which the auxiliary load can operate. In a power line through which a terminal of auxiliary battery 50 or DC/DC converter 40 is connected, for example, a voltage sensor 52 that detects an output voltage of auxiliary battery 50 is provided. Voltage sensor 52 transmits a signal indicating the detected output voltage of auxiliary battery 50 to battery ECU 130.

In the present embodiment, control system 90 includes a plurality of controllers. Specifically, control system 90 includes HV-ECU 100, a charging ECU 110, battery ECU 130, a meter ECU 140, and an update ECU 150.

HV-ECU 100 includes a CPU 102, a memory 104, and an input and output port (not shown) for input and output of various signals. HV-ECU 100 controls SMR 21 and PCU 22 within electrically powered vehicle 1 such that electrically powered vehicle 1 is in a desired traveling state. Various types of control by HV-ECU 100 are carried out by software processing, that is, reading by CPU 102 of a control program stored in memory 104.

A wheel speed sensor 67 is connected to HV-ECU 100. Wheel speed sensor 67 detects a rotation speed (wheel speed) V of drive wheel 66 and transmits a signal indicating detected wheel speed V to HV-ECU 100. HV-ECU 100 calculates a speed of electrically powered vehicle 1 (which is also denoted as a vehicle speed below) based on detected wheel speed V.

Charging ECU 110 includes a CPU 112, a memory 114, and an input and output port (not shown) for input and output of various signals. Charging ECU 110 controls charging relay 26 and charging apparatus 27 within electrically powered vehicle 1 such that electrically powered vehicle 1 in a standstill can externally be charged with the use of charging stand 53. Various types of control by charging ECU 110 are carried out by software processing, that is, reading by CPU 112 of a control program stored in memory 114.

Battery ECU 130 includes a CPU 132, a memory 134, and an input and output port (not shown) for input and output of various signals. Battery ECU 130 obtains information on a state of power storage 20 to calculate a state of charge (SOC) of power storage 20 with the use of the obtained information or to control DC/DC converter 40 to charge auxiliary battery 50. Various types of processing by battery ECU 130 are performed by software processing, that is, reading by CPU 132 of a control program stored in memory 134.

Power storage 20 is provided, for example, with a voltage sensor 136, a current sensor 137, and a temperature sensor 138. Voltage sensor 136, current sensor 137, and temperature sensor 138 are connected to battery ECU 130.

Voltage sensor 136 detects a voltage VB of power storage 20 and transmits a signal indicating detected voltage VB to battery ECU 130. Current sensor 137 detects a current IB of power storage 20 and transmits a signal indicating detected current IB to battery ECU 130. Temperature sensor 138 detects a temperature TB of power storage 20 and transmits a signal indicating detected temperature TB to battery ECU 130.

Battery ECU 130 calculates an SOC that represents a remaining capacity of power storage 20, for example, based on results of detection by voltage sensor 136, current sensor 137, and temperature sensor 138. The SOC represents by a percentage, a ratio of a current amount of stored power to an amount of stored power in a fully charged state of power storage 20. Various known approaches such as an approach by accumulation of current values (coulomb counting) or an approach by estimation of an open circuit voltage (OCV) can be adopted as a method of calculating the SOC.

Voltage sensor 52 that detects a voltage of auxiliary battery 50 is further connected to battery ECU 130. Voltage sensor 52 transmits a signal indicating the voltage of the auxiliary battery to battery ECU 130.

Meter ECU 140 includes a CPU 142, a memory 144, and an input and output port (not shown) for input and output of various signals. Meter ECU 140 controls representation for showing prescribed information on a display (for example, a display apparatus that shows various meters such as a speedometer or a rangefinder or warning lights provided at positions where a driver who sits in a driver's seat can visually recognize them) in a compartment of electrically powered vehicle 1. Various types of control by meter ECU 140 are carried out by software processing, that is, reading by CPU 142 of a control program stored in memory 144.

Update ECU 150 includes a CPU 152, a memory 154, a communication apparatus 156, and an input and output port (not shown) for input and output of various signals. Update ECU 150 transmits update information of a control program to at least any one of HV-ECU 100, charging ECU 110, battery ECU 130, and meter ECU 140 to perform processing for requesting update of the control program.

Communication apparatus 156 is configured to communicate with a device outside electrically powered vehicle 1. Specifically, communication apparatus 156 is configured to communicate with management server 10 described above through communication network 6 and base station 7. Communication network 6 is implemented, for example, by the Internet. Base station 7 and communication apparatus 156 may communicatively be connected to each other through a cellular line (for example, 4G or 5G) or through wireless communication such as WiFi™.

Update ECU 150 performs processing for requesting execution of update processing to have each ECU perform update processing. Various types of processing performed by update ECU 150 are performed by software processing, that is, reading by CPU 152 of a program stored in memory 154. Various types of processing by update ECU 150 are not limited to software processing, but may be performed by dedicated hardware (electronic circuitry).

For example, when update ECU 150 receives difference data for update and information on an ECU which is a target of update from management server 10 through communication apparatus 156, it transmits information that requests the ECU which is the target of update to perform update processing and the difference data for update as update information. When the ECU which is the target of update receives the update information from update ECU 150, it performs update processing for updating the control program stored in the memory with the difference data for update included in the received update information. During such update processing, supply of power to control system 90 should not be stopped.

When update of control programs of a plurality of controllers is required, update of the control programs in parallel in the plurality of controllers may lead to increase in power consumption at the time of update. Furthermore, when a long time period is required for update of the control programs, a period for update may not be secured or lowering in amount of stored power in auxiliary battery 50 due to forced update may not be suppressed.

Then, when control system 90 in the present embodiment receives through communication apparatus 156, update information of a first control program of an ECU that operates during external charging among a plurality of ECUs, control system 90 is assumed to update the first control program with the update information during traveling. Furthermore, when control system 90 receives through communication apparatus 156, update information of a second control program of an ECU that operates during traveling of electrically powered vehicle 1 with the use of MG 62, control system 90 is assumed to update the second control program with the update information during external charging.

By thus updating the first control program during traveling and updating the second control program during external charging, a period for update can be secured. Furthermore, by updating the first control program and updating the second control program during different periods, increase in power consumption at the time of update can be suppressed as compared with power consumption at the time of update of the first control program and the second control program in parallel.

In the present embodiment, update ECU 150 of control system 90 is assumed to mainly perform processing for updating the first control program and the second control program.

Figure 3:
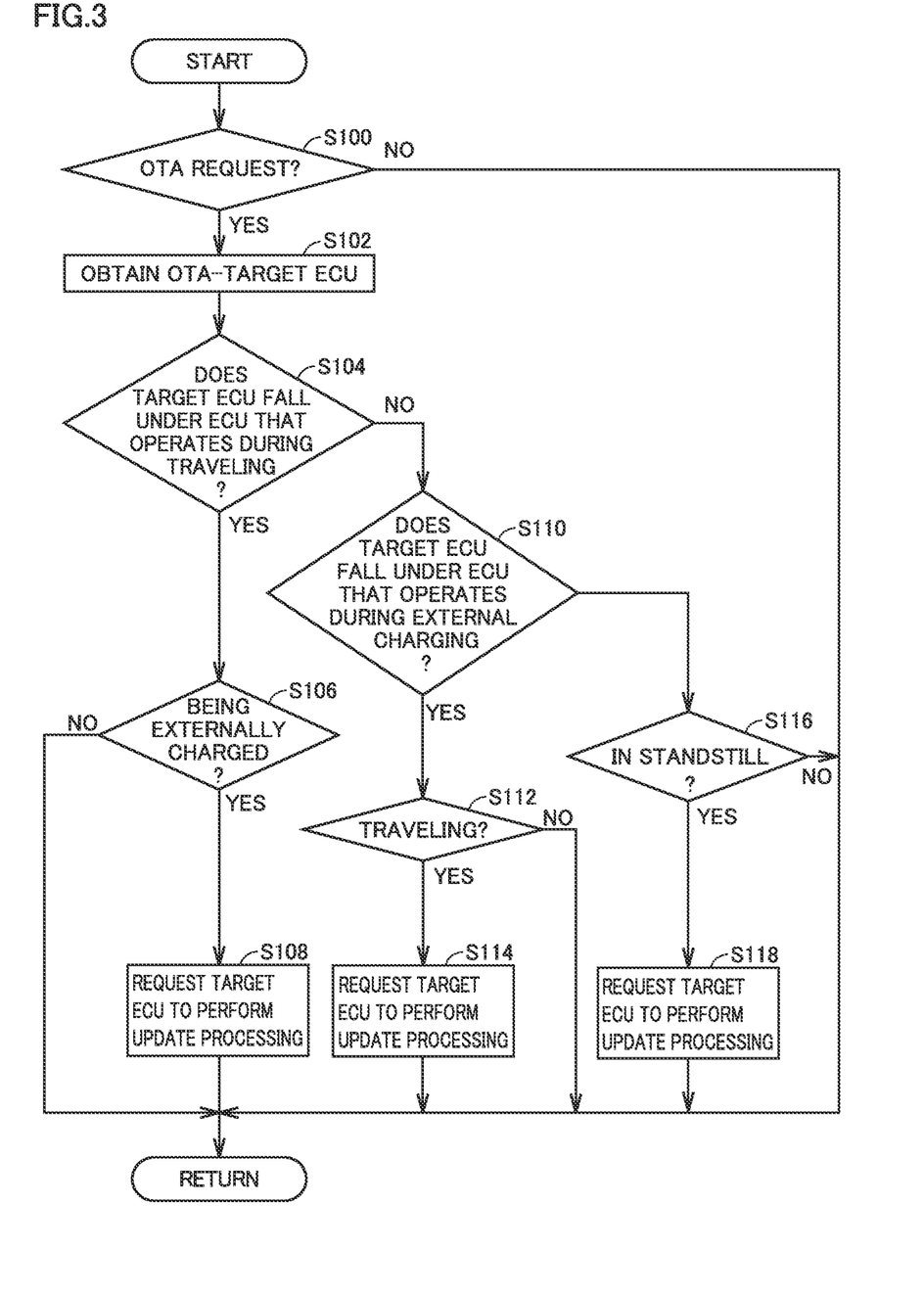
FIG. 3 is a flowchart showing exemplary processing performed by an update ECU.

Exemplary processing performed by update ECU 150 will be described below with reference to FIG. 3. FIG. 3 is a flowchart showing exemplary processing performed by update ECU 150. A series of processing shown in this flowchart is repeatedly performed every prescribed control cycle.

In step (the step being denoted as S below) 100, update ECU 150 determines whether or not an OTA request has been issued. For example, when a flag indicating issuance of the OTA request is on, update ECU 150 determines that the OTA request has been issued. For example, when update ECU 150 receives update information for update of a control program of any of the plurality of ECUs mounted on electrically powered vehicle 1 from management server 10 through communication apparatus 156, update ECU 150 sets the flag indicating issuance of the OTA request to on. When it is determined that the OTA request has been issued (YES in S100), the process moves to S102.

In S102, update ECU 150 obtains an ECU to which the OTA request is directed (which may be denoted as the OTA-target ECU below). When management server 10 transmits the update information of the control program, it has identification information for specifying the OTA-target ECU included in the update information. Update ECU 150 obtains the OTA-target ECU, for example, based on the identification information included in the update information received from management server 10.

In S104, update ECU 150 determines whether or not the OTA-target ECU falls under an ECU that operates during traveling. The ECU that operates during traveling includes, for example, HV-ECU 100 and meter ECU 140. When the OTA-target ECU is determined as falling under the ECU that operates during traveling (YES in S104), the process moves to S106.

In S106, update ECU 150 determines whether or not the electrically powered vehicle is being externally charged. For example, when connector 32 has been attached to inlet 28, when charging apparatus 27 is active, or when charging power is being supplied from charging apparatus 27 to power storage 20, update ECU 150 determines that the electrically powered vehicle is being externally charged. When the electrically powered vehicle is determined as being externally charged (YES in S106), the process moves to S108.

In S108, update ECU 150 requests the target ECU to perform update processing. Specifically, update ECU 150 transmits update information to the OTA-target ECU which is either HV-ECU 100 or meter ECU 140 and requests that ECU to perform processing for updating the control program. When the OTA-target ECU receives the update information from update ECU 150, it updates the control program stored in the memory thereof with the difference data included in the update information. A well-known method should only be employed as a method of updating the control program, and detailed description thereof will not be given. The OTA-target ECU transmits information indicating completion of the update processing to update ECU 150 at the time of completion of the update processing. When update ECU 150 receives that information, it sets the flag indicating issuance of the OTA request to off.

When the OTA-target ECU is determined as not falling under the ECU that operates during traveling (NO in S104), the process moves to S110.

In S110, update ECU 150 determines whether or not the OTA-target ECU falls under an ECU that operates during external charging. The ECU that operates during external charging includes, for example, charging ECU 110. When the OTA-target ECU is determined as falling under the ECU that operates during external charging (YES in S110), the process moves to S112.

In S112, update ECU 150 determines whether or not electrically powered vehicle 1 is traveling. For example, when the vehicle speed is higher than a threshold value, update ECU 150 determines that electrically powered vehicle 1 is traveling. The threshold value is a predetermined value for determining whether or not electrically powered vehicle 1 is traveling, and it is adapted through experiments or the like. When electrically powered vehicle 1 is determined as traveling (YES in S112), the process moves to S114.

In S114, update ECU 150 requests the target ECU to perform update processing. Specifically, update ECU 150 transmits the update information to charging ECU 110 and requests charging ECU 110 to perform processing for updating the control program. When charging ECU 110 receives the update information from update ECU 150, it updates the control program stored in memory 114 thereof with the difference data included in the update information. Charging ECU 110 transmits information indicating completion of the update processing to update ECU 150 at the time of completion of the update processing. When update ECU 150 receives that information, it sets the flag indicating issuance of the OTA request to off.

When the OTA-target ECU is determined as not falling under the ECU that operates during external charging (NO in S110), the process moves to S116.

In S116, update ECU 150 determines whether or not electrically powered vehicle 1 is in a standstill. For example, when the vehicle speed is equal to or lower than the threshold value and connector 32 is not connected to inlet 28, update ECU 150 determines that electrically powered vehicle 1 is in a standstill. When electrically powered vehicle 1 is determined as being in a standstill (YES in S116), the process moves to S118.

In S118, update ECU 150 requests the target ECU to perform update processing. The OTA-target ECU in this case is an ECU that operates during traveling and during external charging, and includes, for example, battery ECU 130. Specifically, update ECU 150 transmits update information to battery ECU 130 and requests battery ECU 130 to perform processing for updating the control program. When battery ECU 130 receives the update information from update ECU 150, it updates the control program stored in memory 134 thereof with the difference data included in the update information. Battery ECU 130 transmits information indicating completion of the update processing to update ECU 150 at the time of completion of the update processing. When update ECU 150 receives that information, it sets the flag indicating issuance of the OTA request to off.

When it is determined that the OTA request has not been issued (NO in S100), when the electrically powered vehicle is determined as not being externally charged (NO in S106), when the electrically powered vehicle is determined as not traveling (NO in S112), or when the electrically powered vehicle is determined as not being in a standstill (NO in S116), this process ends.

Figure 4:
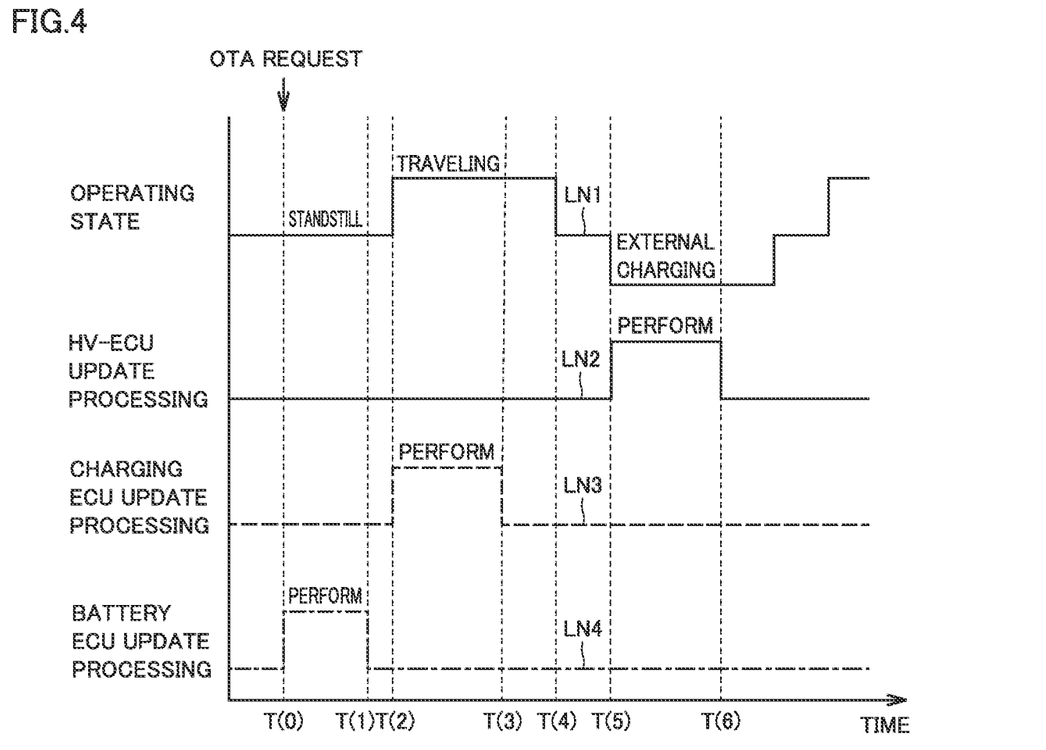
FIG. 4 is a timing chart showing an exemplary operation of the update ECU.

An exemplary operation of update ECU 150 in the present embodiment, based on the structure and the flowchart as above, will be described with reference to FIG. 4. FIG. 4 is a timing chart showing an exemplary operation of update ECU 150. The ordinate in FIG. 4 represents an operating state of electrically powered vehicle 1, whether or not HV-ECU 100 performs update processing, whether or not charging ECU 110 performs update processing, and whether or not battery ECU 130 performs update processing. The abscissa in FIG. 4 represents time. LN1 in FIG. 4 represents variation in operating state of electrically powered vehicle 1. LN2 in FIG. 4 represents variation in whether or not HV-ECU 100 performs update processing. LN3 (a dashed line) in FIG. 4 represents whether or not charging ECU 110 performs update processing when charging ECU 110 is the OTA-target ECU. LN4 (a chain dotted line) in FIG. 4 represents whether or not battery ECU 130 performs update processing when battery ECU 130 is the OTA-target ECU.

An example in which update information of the control program of HV-ECU 100 is received at time T(0) is assumed. In this case, since the flag indicating issuance of the OTA request is turned on, it is determined that the OTA request has been issued (YES in S100).

The fact that the OTA-target ECU is HV-ECU 100 based on the identification information included in the update information is obtained (S102). Since HV-ECU 100 which is the OTA-target ECU falls under the ECU that operates during traveling (YES in S104), whether or not the electrically powered vehicle is being externally charged is determined (S106).

Therefore, as shown with LN1 in FIG. 4, until time T(5), the operating state of electrically powered vehicle 1 does not fall under external charging, and hence HV-ECU 100 is not requested to perform update processing. When the operating state of electrically powered vehicle 1 changes to external charging at time T(5) (YES in S106), HV-ECU 100 is requested to perform update processing (S108). Therefore, as shown with LN2 in FIG. 4, during a period from time T(5) to time T(6), HV-ECU 100 performs update processing. When update processing is completed at time T(6), the flag indicating issuance of the OTA request is set to off.

Then, an example in which update information of the control program of charging ECU 110 is received at time T(0) is assumed. In this case, since the flag indicating issuance of the OTA request is turned on, it is determined that the OTA request has been issued (YES in S100).

The fact that the OTA-target ECU is charging ECU 110 based on the identification information included in the update information is obtained (S102). Since charging ECU 110 which is the OTA-target ECU falls under the ECU that operates during external charging (NO in S104 and YES in S110), whether or not electrically powered vehicle 1 is traveling is determined (S112).

Therefore, as shown with LN1 in FIG. 4, the operating state of electrically powered vehicle 1 does not fall under traveling until time T(2). Therefore, charging ECU 110 is not requested to perform update processing. When the operating state of electrically powered vehicle 1 changes to traveling at time T(2) (YES in S112), charging ECU 110 is requested to perform update processing (S114).

Therefore, as shown with LN3 (dashed line) in FIG. 4, during a period from time T(2) to time T(3), charging ECU 110 performs update processing. When update processing is completed at time T(3), the flag indicating issuance of the OTA request is set to off.

Then, an example in which update information of the control program of battery ECU 130 is received at time T(0) is assumed. In this case, since the flag indicating issuance of the OTA request is turned on, it is determined that the OTA request has been issued (YES in S100).

The fact that the OTA-target ECU is battery ECU 130 based on the identification information included in the update information is obtained (S102).

Since battery ECU 130 which is the OTA-target ECU falls under neither the ECU that operates during external charging nor the ECU that operates during traveling (NO in S104 and NO in S110), whether or not electrically powered vehicle 1 is in a standstill is determined (S116).

Therefore, as shown with LN1 in FIG. 4, when the operating state falls under standstill at time T(0) (YES in S116), battery ECU 130 is requested to perform update processing (S118).

Therefore, as shown with LN4 (the chain dotted line) in FIG. 4, during a period from time T(0) to time T(1), battery ECU 130 performs update processing. When update processing is completed at time T(1), the flag indicating issuance of the OTA request is set to off.

As set forth above, according to the electrically powered vehicle in the present embodiment, the control program of charging ECU 110 that operates during external charging is updated during traveling and the control program of HV-ECU 100 or meter ECU 140 that operates during traveling is updated during external charging, so that a period for update can be secured. Furthermore, by updating the control program of charging ECU 110 and updating the control program of HV-ECU 100 or meter ECU 140 during different periods, increase in power consumption at the time of update can be suppressed as compared with power consumption at the time of update of these control programs in parallel. Therefore, the electrically powered vehicle, the method of controlling the electrically powered vehicle, and the controller that controls the electrically powered vehicle, with which a period for update can be secured while increase in power consumption at the time of update of the control programs of the plurality of controllers mounted on the electrically powered vehicle is suppressed, can be provided.

Furthermore, since the control program of battery ECU 130 that operates during external charging and during traveling is updated while electrically powered vehicle 1 is in a standstill, the period for update can be secured. By updating the control program of battery ECU 130 during a period different from a period of update of the control program of charging ECU 110 and update of the control program of HV-ECU 100 or meter ECU 140, increase in power consumption at the time of update can be suppressed as compared with power consumption at the time of update of these control programs in parallel.

A modification will be described below.

The embodiment above describes that, when the OTA-target ECU falls under the ECU that operates during charging, the target ECU is requested to perform update processing during traveling. In addition to during traveling, however, for example, when electrically powered vehicle 1 is able to arrive at a destination even when power consumption increases due to update processing, the target ECU may be requested to perform update processing.

Figure 5:
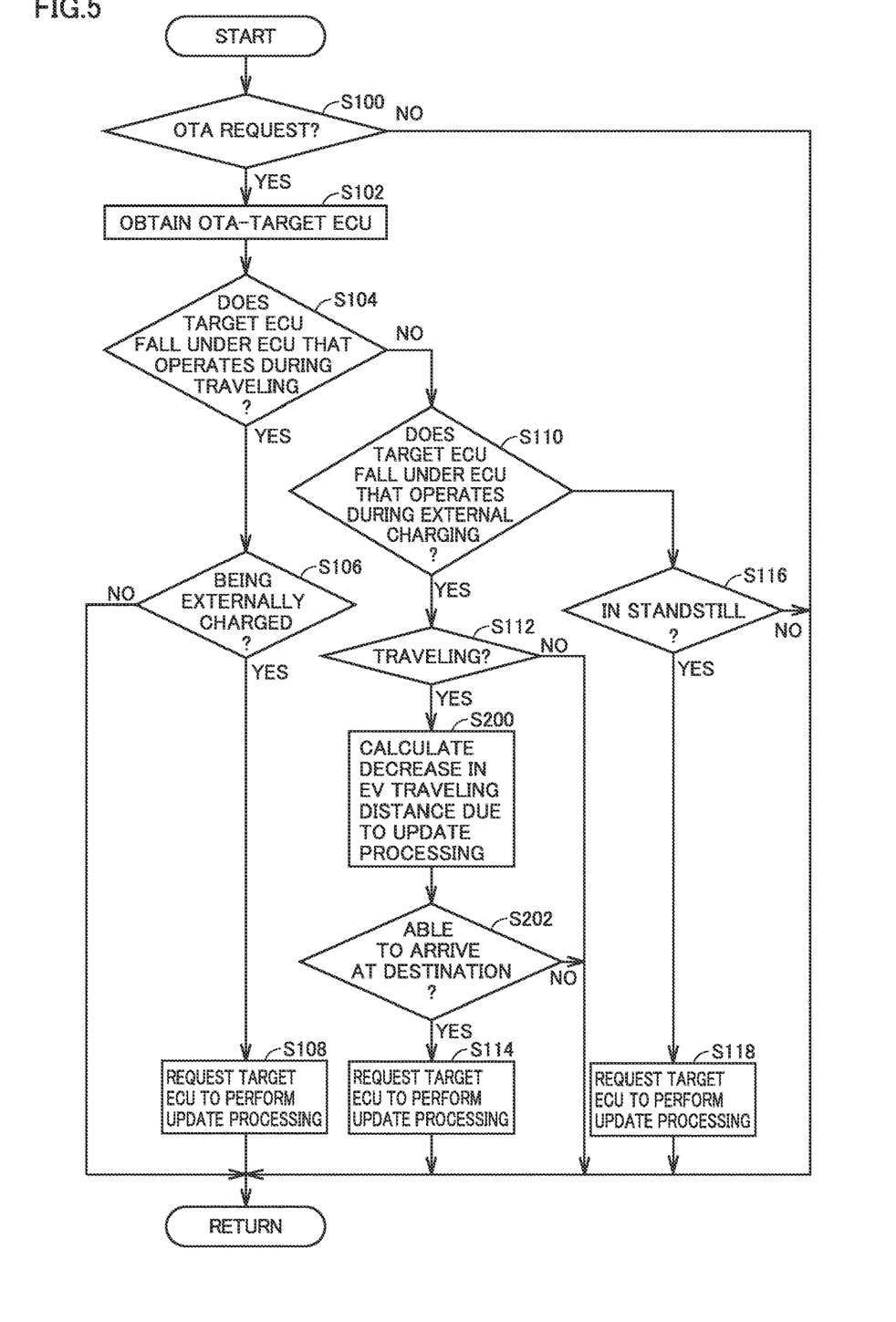
FIG. 5 is a flowchart showing one example of processing performed by the update ECU in a modification.

One example of control processing performed by update ECU 150 in the modification will be described below with reference to FIG. 5. FIG. 5 is a flowchart showing one example of processing performed by update ECU 150 in the modification. A series of processing shown in this flowchart is repeatedly performed every prescribed control cycle.

Processing in S100, S102, S104, S106, S108, S110, S112, S114, S116, and S118 (which are denoted as "S100 to S118" below) described in the flowchart shown in FIG. 5 is similar in processing contents to processing in S100 to S118 described in the flowchart shown in FIG. 3, except for a case which will be described below. Therefore, detailed description thereof will not be repeated.

When electrically powered vehicle 1 is determined as traveling (YES in S112), the process moves to S200.

In S200, update ECU 150 calculates a decrease in EV traveling distance due to update processing. The EV traveling distance represents a traveling distance of electrically powered vehicle 1 with the use of MG 62. Update ECU 150 calculates as the decrease in EV traveling distance, for example, the EV traveling distance corresponding to an amount of power consumption during a period for which update processing is performed. The amount of power consumption by update processing may be set, for example, to a predetermined value, or may be calculated by estimating a time period for update from an amount of updated data and calculating the amount of power consumption based on the estimated time period for update and the amount of power consumption per hour. Furthermore, update ECU 150 calculates as the decrease in EV traveling distance, the EV traveling distance calculated based on the amount of power consumption per unit distance during electrically powered traveling with the use of MG 62 and the amount of power consumption by update processing.

In S202, update ECU 150 determines whether or not electrically powered vehicle 1 is able to arrive at the destination. Specifically, when a distance from a current location to the destination of electrically powered vehicle 1 is shorter than a distance to empty, update ECU 150 determines that electrically powered vehicle 1 is able to arrive at the destination. The distance to empty is calculated, for example, by subtracting the decrease in EV traveling distance due to update processing from the distance to empty based on the current SOC. Update ECU 150 obtains position information of the destination and position information of the current location, for example, from a not-shown navigation system. When it is determined that electrically powered vehicle 1 is able to arrive at the destination (YES in S202), the process moves to S114. When it is determined that electrically powered vehicle 1 is unable to arrive at the destination (NO in S202), the process ends.

An exemplary operation of update ECU 150 in this modification based on the flowchart as above will be described.

An example in which update information of the control program of charging ECU 110 is received is assumed. In this case, since the flag indicating issuance of the OTA request is turned on, it is determined that the OTA request has been issued (YES in S100).

The fact that the OTA-target ECU is charging ECU 110 based on the identification information included in the update information is obtained (S102). Since charging ECU 110 which is the OTA-target ECU falls under the ECU that operates during external charging (NO in S104 and YES in S110), whether or not electrically powered vehicle 1 is traveling is determined (S112).

When the operating state of electrically powered vehicle 1 changes to traveling (YES in S112), a decrease in EV traveling distance due to update processing is calculated (S200) and whether or not electrically powered vehicle 1 is able to arrive at the destination is determined in consideration of the calculated decrease (S202). Then, when it is determined that electrically powered vehicle 1 is able to arrive at the destination (YES in S202), charging ECU 110 which is the target ECU is requested to perform update processing (S114). Therefore, charging ECU 110 performs update processing, and when the update processing is completed, the flag indicating issuance of the OTA request is set to off.

Thus, since the control program of charging ECU 110 is not updated during traveling when electrically powered vehicle 1 is unable to arrive at the destination with increase in amount of power consumption by processing for updating the control program of charging ECU 110, electrically powered vehicle 1 is able to arrive at the destination.

The embodiment above describes that, when the OTA-target ECU falls under the ECU that operates during traveling, the target ECU is requested to perform update processing during charging. In addition to during charging, however, for example, when charging of power storage 20 can be completed by departure time even when power consumption increases due to update processing, the target ECU may be requested to perform update processing.

Figure 6:
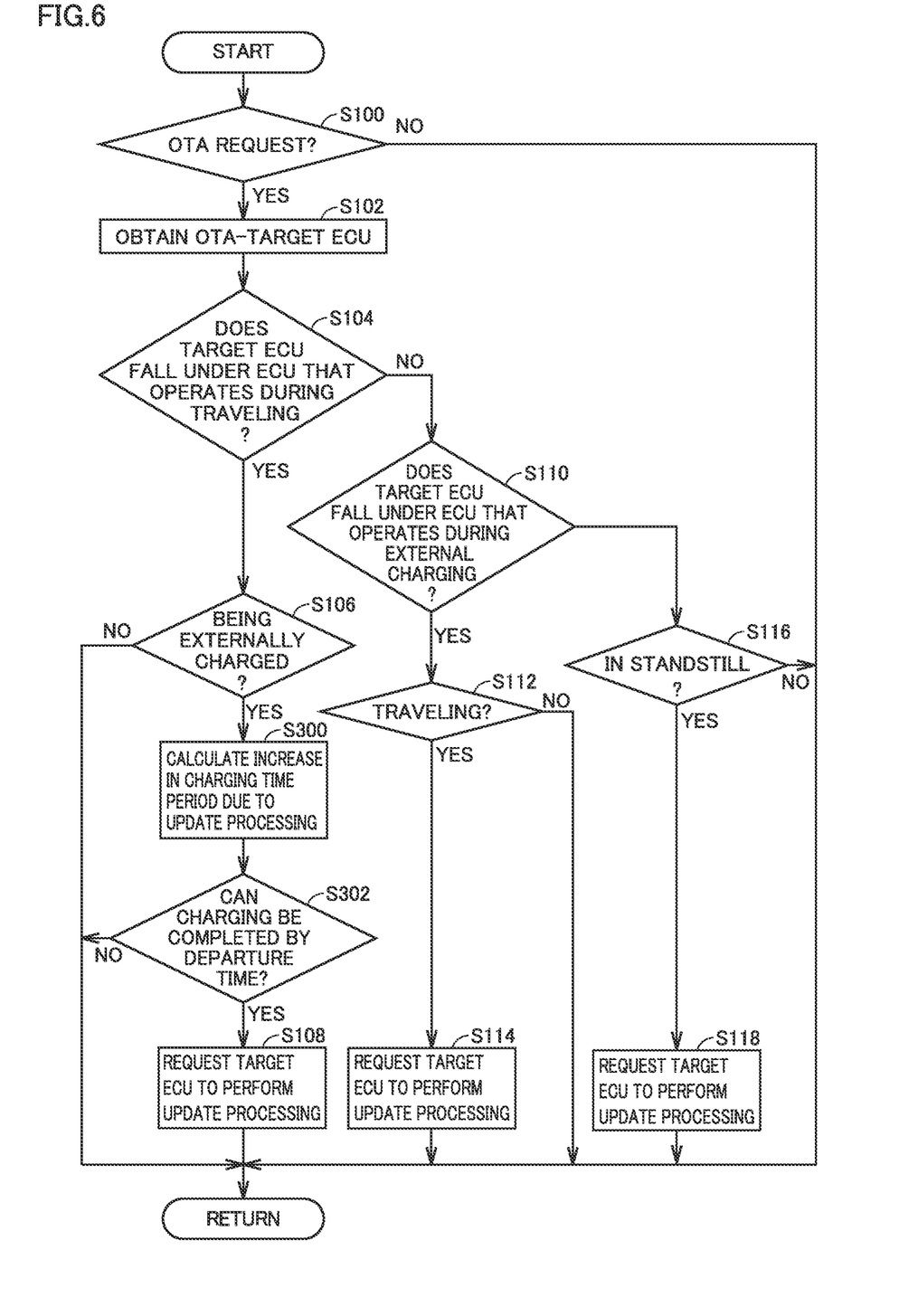
FIG. 6 is a flowchart showing another example of processing performed by the update ECU in a modification.

Another example of control processing performed by update ECU 150 in a modification will be described below with reference to FIG. 6. FIG. 6 is a flowchart showing another example of processing performed by update ECU 150 in the modification. A series of processing shown in this flowchart is repeatedly performed every prescribed control cycle.

Processing in S100 to S118 described in the flowchart shown in FIG. 6 is similar in processing contents to processing in S100 to S118 described in the flowchart shown in FIG. 3, except for a case which will be described below. Therefore, detailed description thereof will not be repeated.

When it is determined that the electrically powered vehicle is being externally charged (YES in S106), the process moves to S300.

In S300, update ECU 150 calculates an increase in charging time period due to update processing. For example, update ECU 150 calculates as the increase in charging time period, a time period for charging by an amount of electric power corresponding to the amount of power consumption during a period for which update processing is performed. Since the amount of power consumption by update processing is as described above, detailed description thereof will not be repeated. Update ECU 150 calculates as the increase in charging time period, the charging time period calculated from charging power per unit time and the amount of power consumption by update processing.

In S302, update ECU 150 determines whether or not charging of power storage 20 can be completed by the departure time. Specifically, update ECU 150 calculates the charging time period necessary by the time of completion of charging from the amount of charging power corresponding a difference between the current SOC and the SOC at the time of completion of charging (for example, the SOC corresponding to the fully charged state) and charging power per unit time, and calculates the time of completion of charging with current time being defined as the starting point by adding the increase to the calculated charging time period. When the time of completion of charging is before scheduled departure time, update ECU 150 determines that charging of power storage 20 can be completed by the departure time. When the time of completion of charging is later than the scheduled departure time, update ECU 150 determines that charging of power storage 20 cannot be completed by the departure time. For example, update ECU 150 may obtain information on charging power from charging stand 53 or may calculate charging power from a voltage and a current of power storage 20 that is being externally charged. When it is determined that charging of power storage 20 can be completed by the departure time (YES in S302), the process moves to S108. When it is determined that charging of power storage 20 cannot be completed by the departure time (NO in S302), the process ends.

An exemplary operation of update ECU 150 in this modification based on the flowchart as above will be described.

An example in which update information of the control program of HV-ECU 100 is received is assumed. In this case, since the flag indicating issuance of the OTA request is turned on, it is determined that the OTA request has been issued (YES in S100).

The fact that the OTA-target ECU is HV-ECU 100 based on the identification information included in the update information is obtained (S102). Since HV-ECU 100 which is the OTA-target ECU falls under the ECU that operates during traveling (YES in S104), whether or not the electrically powered vehicle is being externally charged is determined (S106).

When the electrically powered vehicle is being externally charged (YES in S106), an increase in charging time period due to update processing is calculated (S300), and whether or not charging of power storage 20 can be completed by the departure time of electrically powered vehicle 1 is determined in consideration of increase in calculated charging time period (S302). When it is determined that charging of power storage 20 can be completed by the departure time (YES in S302), HV-ECU 100 which is the target ECU is requested to perform update processing (S108). Therefore, HV-ECU 100 performs update processing, and when the update processing is completed, the flag indicating issuance of the OTA request is set to off.

Thus, when charging of power storage 20 cannot be completed by the departure time due to increase in amount of power consumption by processing for updating the control program of HV-ECU 100, the control program of HV-ECU 100 is not updated during external charging. Therefore, charging of power storage 20 can be completed by the departure time.

The embodiment above describes that, when the OTA-target ECU falls under the ECU that operates during traveling and during external charging, update processing for the target ECU is performed while electrically powered vehicle 1 is in a standstill. For example, however, auxiliary battery 50 may be charged during traveling or during external charging of electrically powered vehicle 1, and when an amount of stored power necessary for the target ECU to perform update processing remains in auxiliary battery 50 while electrically powered vehicle 1 is in a standstill, the ECU which is the target of update may be requested to perform update processing.

Figure 7:
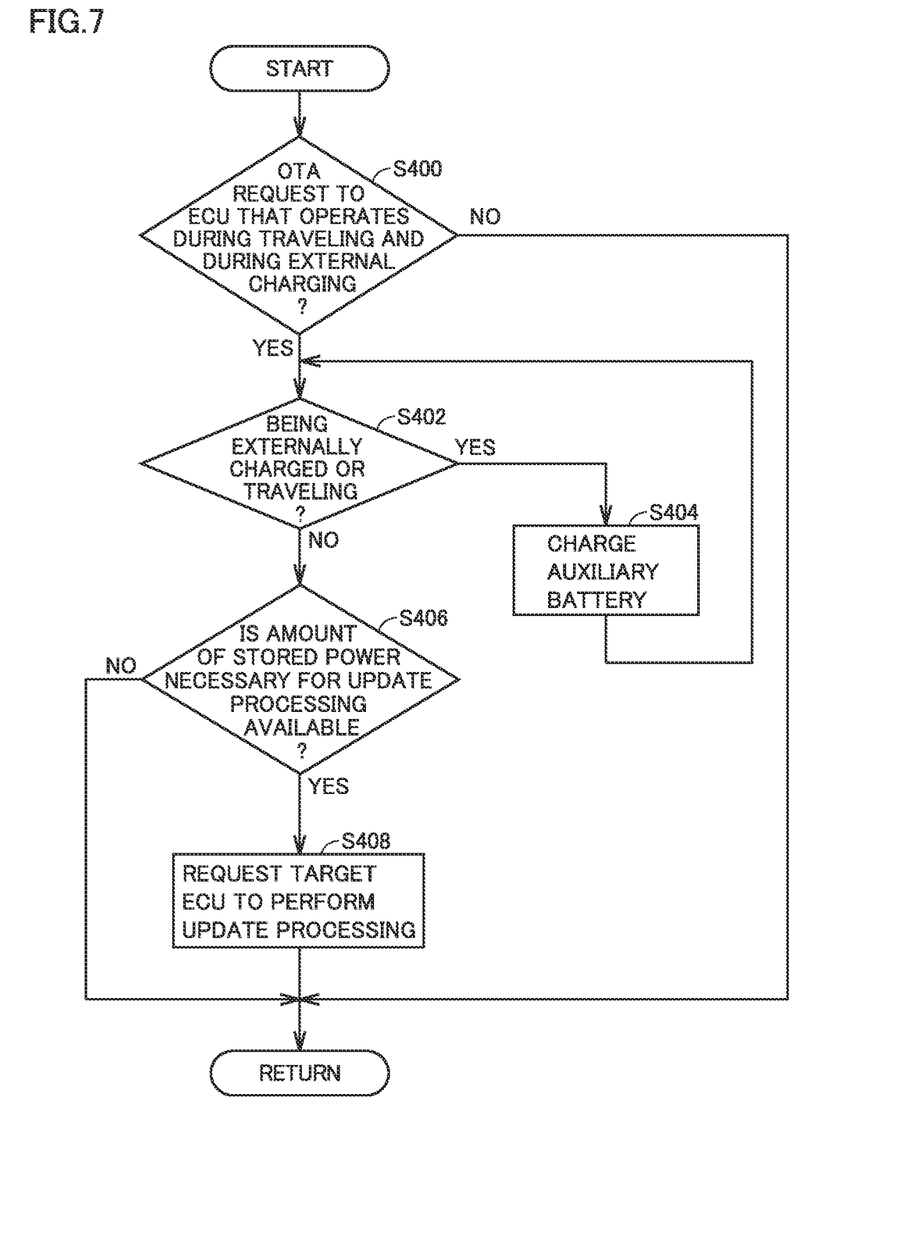
FIG. 7 is a flowchart showing yet another example of processing performed by the update ECU in a modification.

Yet another example of control processing performed by update ECU 150 in a modification will be described below with reference to FIG. 7. FIG. 7 is a flowchart showing yet another example of processing performed by update ECU 150 in the modification.

In S400, update ECU 150 determines whether or not an OTA request has been issued to the ECU that operates during traveling and during external charging. As described above, the ECU that operates during traveling and during external charging includes battery ECU 130. Therefore, when the OTA request to battery ECU 130 has been issued, update ECU 150 determines that the OTA request has been issued to the ECU that operates during traveling and during external charging. When it is determined that the OTA request has been issued to the ECU that operates during traveling and during external charging (YES in S400), the process moves to S402.

In S402, update ECU 150 determines whether electrically powered vehicle 1 is traveling or being externally charged. Since the method of determining whether or not electrically powered vehicle 1 is traveling and the method of determining whether or not electrically powered vehicle 1 is being externally charged are as described above, detailed description thereof will not be repeated. When electrically powered vehicle 1 is traveling or being externally charged (YES in S402), the process moves to S404.

In S404, update ECU 150 has auxiliary battery 50 charged. Update ECU 150 has auxiliary battery 50 charged by DC/DC converter 40 by means of battery ECU 130. When the amount of stored power in auxiliary battery 50 is smaller than a threshold value (for example, a voltage of auxiliary battery 50 is lower than a threshold value), update ECU 150 controls DC/DC converter 40 to charge auxiliary battery 50. Update ECU 150 sets the threshold value, for example, such that the threshold value in an example where the OTA request to battery ECU 130 has been issued is higher than in an example where the OTA request has not been issued.

When electrically powered vehicle 1 is neither traveling nor being externally charged (for example, electrically powered vehicle 1 is in a standstill) (NO in S402), the process moves to S406.

In S406, update ECU 150 determines whether or not an amount of stored power necessary for update processing is available in auxiliary battery 50. For example, when the voltage of auxiliary battery 50 is higher than the threshold value, update ECU 150 determines that the amount of stored power necessary for update processing is available in auxiliary battery 50. When it is determined that the amount of stored power necessary for update processing is available in auxiliary battery 50 (YES in S406), the process moves to S408.

In S408, update ECU 150 requests battery ECU 130 which is the OTA-target ECU to perform update processing. When battery ECU 130 receives update information from update ECU 150, it updates the control program stored in memory 134 thereof with the difference data included in the update information. Battery ECU 130 transmits information indicating completion of the update processing to update ECU 150 at the time of completion of the update processing. When update ECU 150 receives that information, it sets the flag indicating issuance of the OTA request to off.

Thus, electric power necessary for performing update processing can be secured by charging of auxiliary battery 50 during external charging or during traveling of electrically powered vehicle 1. Therefore, battery ECU 130 can update the control program while the vehicle is in a standstill.

The embodiment above describes that update ECU 150 requests the OTA-target ECU to perform update processing. Update processing, however, should only be performed in control system 90, and is not particularly limited to the update processing performed by the OTA-target ECU in response to a request from update ECU 150. For example, update ECU 150 may perform processing for updating each ECU, or any ECU included in control system 90 may perform processing for updating each ECU.

The embodiment above describes that the update information received from management server 10 includes update information of any one ECU in control system 90. The update information received from management server 10, however, may include, for example, update information of a plurality of ECUs. In this case, the control programs may be updated in the order in accordance with a priority set in advance for each ECU, or when the update information includes information that defines the order of update, the control program of each ECU may be updated in the defined order of update.

The embodiment above describes that update ECU 150 requests the OTA-target ECU to perform update processing. For example, however, management server 10 may request the OTA-target ECU to perform update processing. For example, management server 10 may obtain information on whether electrically powered vehicle 1 is traveling, being externally charged, or in a standstill from electrically powered vehicle 1 by communicating therewith and may request the OTA-target ECU to perform update processing with the use of the obtained information.

The entirety or a part of the modification may be carried out as being combined as appropriate.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An electrically powered vehicle comprising:
a power storage chargeable with a power supply outside the vehicle;
a drive motor that drives the vehicle with electric power in the power storage;
a reception apparatus that receives predetermined information from outside of the vehicle; and
a control system composed of a plurality of controllers including a first controller and a second controller, wherein
the first controller controls, by using a first control program, a device to be controlled that operates during charging of the power storage with the power supply outside the vehicle,
the second controller controls, by using a second control program, a device to be controlled that operates during traveling of the vehicle with the drive motor, and
when the control system receives update information of the first control program with the reception apparatus, the control system updates the first control program with the update information during traveling,
when the control system receives update information of the second control program with the reception apparatus, the control system updates the second control program with the update information during charging,
the plurality of controllers further include a third controller that controls, by using a third control program, a device to be controlled that operates during each of charging and traveling, and
when the control system receives update information of the third control program with the reception apparatus, the control system updates the third control program with the update information while the vehicle is in a standstill.

2. The electrically powered vehicle according to claim 1, further comprising an auxiliary battery that supplies electric power to the third controller, wherein
when the control system receives the update information of the third control program with the reception apparatus, the control system has the auxiliary battery charged during at least any one of charging and traveling, and
when an amount of stored power in the auxiliary battery is equal to or larger than a threshold value on which update of the third control program can be based while the vehicle is in a standstill, the control system updates the third control program with the update information.

3. The electrically powered vehicle according to claim 1, wherein
when the control system receives the update information of the first control program with the reception apparatus and a distance to empty becomes shorter than a distance to a destination of the vehicle due to increase in amount of power consumption with update of the first control program, the control system does not update the first control program during traveling.

4. The electrically powered vehicle according to claim 1, wherein
when the control system receives the update information of the second control program with the reception apparatus and charging of the power storage cannot be completed by departure time due to increase in amount of power consumption with update of the second control program, the control system does not update the second control program during charging.

5. A method of controlling an electrically powered vehicle including a power storage chargeable with a power supply outside the vehicle, a drive motor that drives the vehicle with electric power in the power storage, a reception apparatus that receives predetermined information from outside of the vehicle, and a control system composed of a plurality of controllers including a first controller and a second controller, the first controller controlling, by using a first control program, a device to be controlled that operates during charging of the power storage with the power supply outside the vehicle, the second controller controlling, by using a second control program, a device to be controlled that operates during traveling of the vehicle with the drive motor, the method comprising:
updating, when update information of the first control program is received with the reception apparatus, the first control program with the update information during traveling; and
updating, when update information of the second control program is received with the reception apparatus, the second control program with the update information during charging, wherein
the plurality of controllers further include a third controller that controls, by using a third control program, a device to be controlled that operates during each of charging and traveling, and
the method further comprising updating, when the control system receives update information of the third control program with the reception apparatus, the third control program with the update information while the vehicle is in a standstill.

6. A controller that controls an electrically powered vehicle including a power storage chargeable with a power supply outside the vehicle, a drive motor that drives the vehicle with electric power in the power storage, and a reception apparatus that receives predetermined information from outside of the vehicle,
the controller being configured to communicate with
a first controller that controls, by using a first control program, a device to be controlled that operates during charging of the power storage with the power supply outside the vehicle, and
a second controller that controls, by using a second control program, a device to be controlled that operates during traveling of the vehicle with the drive motor,
when the controller receives update information of the first control program with the reception apparatus, the controller requesting the first controller to update the first control program with the update information during traveling,
when the controller receives update information of the second control program with the reception apparatus, the controller requesting the second controller to update the second control program with the update information during charging, wherein
the controller is further configured to communicate with a third controller that controls, by using a third control program, a device to be controlled that operates during each of charging and traveling, and when the controller receives update information of the third control program with the reception apparatus, the controller updates the third control program with the update information while the vehicle is in a standstill.

* * * * *